UNITED STATES PATENT OFFICE.

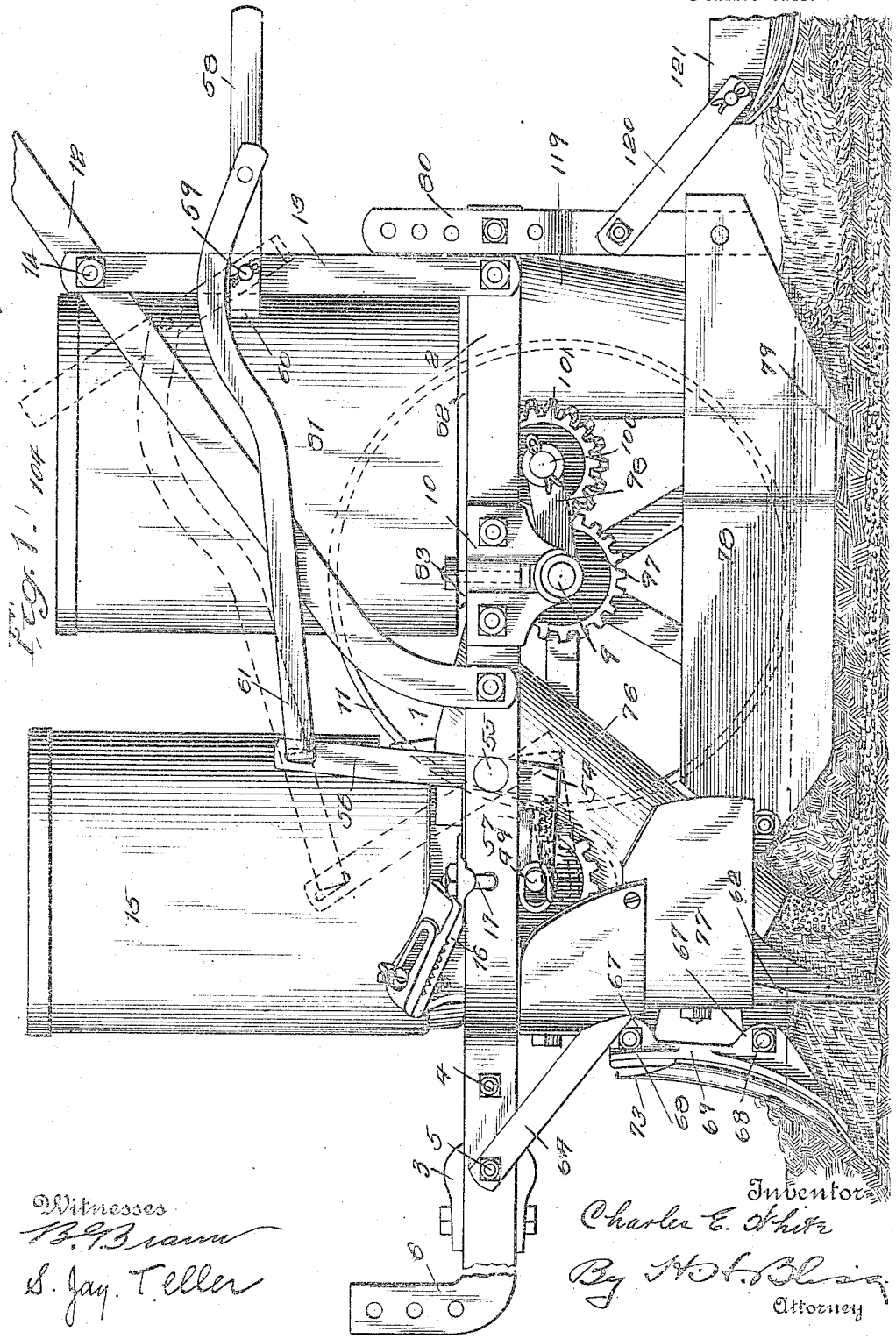

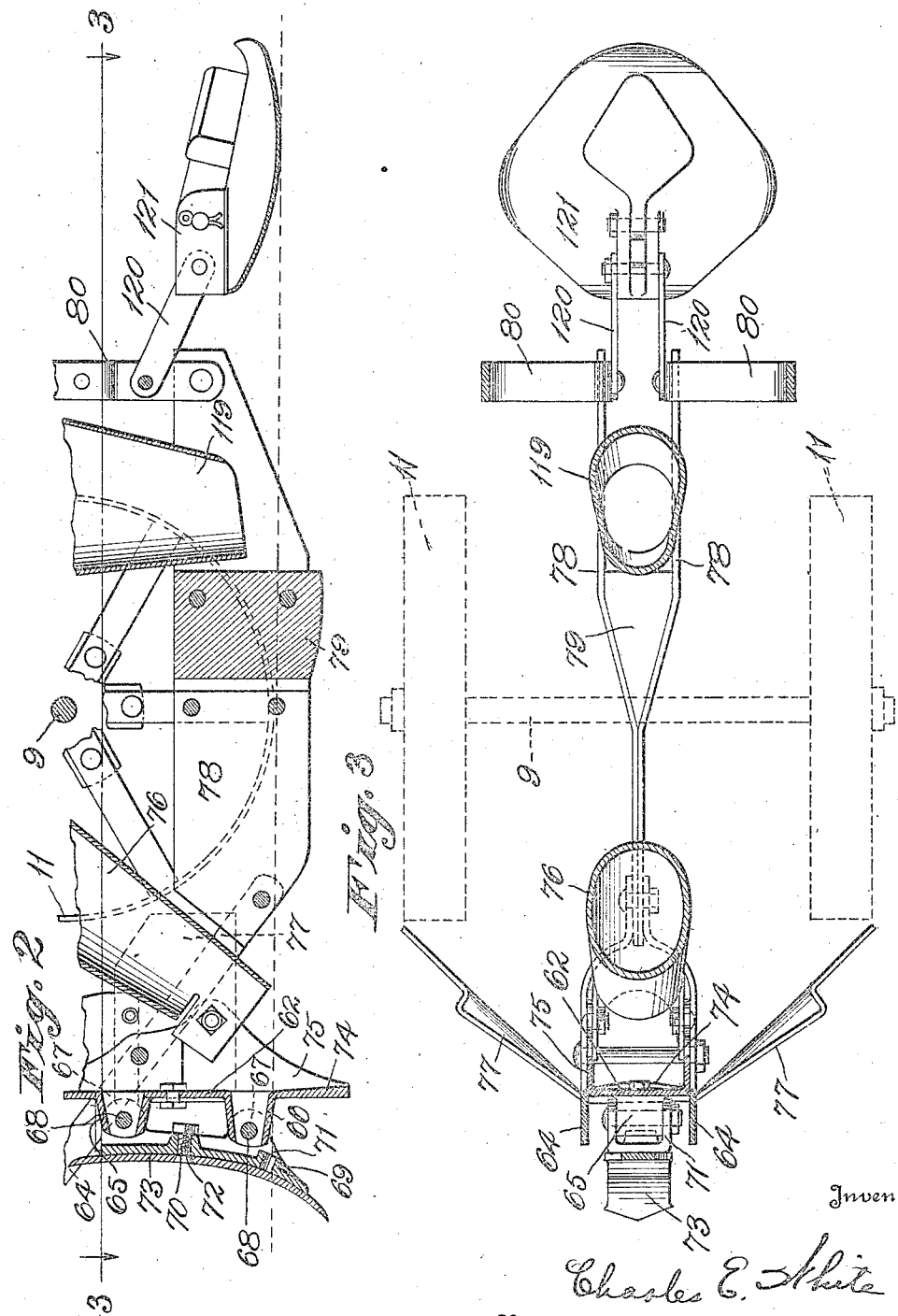

CHARLES E. WHITE, OF MOLINE, ILLINOIS, ASSIGNOR TO DEERE & MANSUR CO., A CORPORATION OF ILLINOIS.

SEED-PLANTER.

1,247,763.  Specification of Letters Patent.  Patented Nov. 27, 1917.

Application filed January 19, 1911. Serial No. 603,519.

*To all whom it may concern:*

Be it known that I, CHARLES E. WHITE, a citizen of the United States, residing at Moline, in the county of Rock Island and State of Illinois, have invented certain new and useful Improvements in Seed-Planters, of which the following is a specification, reference being had therein to the accompanying drawing.

This invention relates to improvements in seed planters and more particularly to the type of planters adapted for the distribution of fertilizer in connection with the planting operation. A machine embodying my invention is especially adapted for the planting of cotton seed, but by substituting a different form of seed separating and feeding mechanism, the machine may also be adapted for the planting of corn, peas or other seed.

I have shown in the drawings a single row planter adapted for drilling. It will be understood, however, that certain features of my invention are also applicable to machines adapted for hill planting or for simultaneously planting two or more parallel rows.

The main object of my invention is to provide improved means for adjusting the depth of planting, improved means for covering the seed, and an improved general arrangement of parts. Still further objects will appear from the following specification and the accompanying drawings.

In the drawings which form a part of this specification I have shown as one embodiment of my invention the form of machine which I now consider preferable. It is to be understood, however, that various changes of construction and re-arrangements of parts may be made without departing from the scope and spirit of my invention.

Of the drawings:

Figure 1 is a side elevation and shows the relative positions in the ground of the various parts and of the fertilizer and the seeds.

Fig. 2 is a vertical longitudinal sectional view of the ground treating and forming elements.

Fig. 3 is a horizontal section along the line 3—3 of Fig. 2.

Referring to the drawings, 1 represents as a whole the main frame-work which comprises the two parallel side bars 2—2 which are bent inward at their forward ends and connected to the forward spacing casting or yoke 3 by means of through bolts 4 and 5. The casting 3 is forked at its forward end and embraces the short tongue 6 which is adapted for the attachment of horses at its forward end. The rear ends of the side bars 2—2 are connected by a cross bar. Near the center of the frame 1 is a transverse axle 9 which is rotatably mounted in suitable bearings 10—10 secured to the side bars 2—2. Mounted upon the ends of the axle 9 and secured to it are the two supporting and driving wheels 11—11.

12—12 are handle bars connected at their forward ends to points near the center of the side bars 2—2. Braces 13—13 are provided for the handle bars 12—12. A tie or spacer rod 14 serves to connect the handle bars with the braces.

The fertilizer hopper and distributing mechanism is indicated as an entirety by 15. This is mounted upon a base plate or supporting casting 16 which is secured to the side bars 2—2 of the main frame by means of the hooked bolts 17—17.

An arm 54 is pivoted to the left hand side bar of the main frame at 55, and at its forward end is slotted to embrace the end of the shaft 49. The rear end of the arm adjacent to the pivot is box-like in shape and a substantially vertical lever 56 extends into the box-like portion of the arm and is pivotally mounted on the pin 55. There is formed in the arm 54 a socket in which is provided a small coil spring 57 adapted to bear against the lower end of the arm 56. A certain amount of lost motion is allowed between the arm and the lever, the spring 57 tending to hold the lower end of the lever in its backward position relative to the arm.

58 is a hand lever pivotally mounted at 59 on the left-hand upright or brace 13. The forward end of this lever is bent outward to form a stop 60. 61 is a connecting link between the upper end of the lever 56 and the hand lever 58. The lever 61 is preferably curved or bowed upward near its rear end to permit the line of tension to fall below the pivot 59. The stop 60 engages the under side of the curved portion of the link and serves to prevent further downward movement of the rear part of the hand lever 58.

62 is a vertical depending plow frame arm which is secured at its upper end to the casting 3 by means of a bolt. Two diagonal braces 64—64 connect the arm 62 with the forward part of the casting 3. Two lugs 65 and 66 project forward from the arm 62, and connected to these lugs by means of ears 67 and bolts 68 is a plow supporting bracket 69 which is concaved vertically and convexed transversely. Two apertured bosses 70 and 71 are provided on the bracket 69 and by means of a bolt 72 adapted to pass through these apertures a plow or digger 73 is secured in place on the bracket. The plow 73 is preferably formed of steel and is shaped to conform with the concavo-convex surface of the bracket. The bolt 72 passes through the plow at a point slightly nearer one end than the other, and in this way by reversing the position of the plow or by using one or the other of the apertured bosses 70 and 71, a variety of positions of the plow may be obtained.

The lower end of the arm 62 is made in the form of a box-like nose 74, having rearward extending lateral side walls 75.

76 is a cone-shaped sheet metal chute supported at its lower end by means of ears attached to the side walls 75 formed on the arm 62.

77 represents a V-shaped guard or fender which is formed of sheet metal, preferably in two parts, and secured to the arm 62. The lower edge of the fender 77 is preferably a small distance above the ground line.

78 is a runner or a furrow-opener. As is shown in Fig. 3, the rear end of the runner is bifurcated and between the two parts there is secured by rivets or otherwise a block 79. The lower edge of the block preferably extends somewhat below the lower edge of the runner proper, as is shown in Fig. 2. The forward end of the runner is secured to the lower rear ends of the braces 64—64. The rear bifurcated end of the runner is secured by means of links 80—80, which are bent outward and provided at their upper ends with a series of holes by means of which they can be connected in any one of a plurality of positions to the rear ends of the frame side bars 2—2.

81 represents, as a whole, the seed hopper and the seed-separating and feeding mechanism. The parts indicated by 81 are supported on a base plate 82 which is secured by means of ears 83—83 to the side bars 2—2 of the main frame.

97 is a gear wheel secured to the axle 9. 98 is a bearing bracket pivotally mounted on the axle 9 and held against displacement in one direction by the hub of the gear wheel 97 and in the other direction by a cotter pin. At the rear end of the bracket 98 there is rotatably mounted a shaft 100 parallel to the axle 9. A gear 101 is mounted on the shaft and meshes with the gear 97. The gear 101 is also adapted to mesh with the teeth formed on the gear ring of the said hopper 81. The gear 101 is beveled to properly engage the teeth of the said hopper gearing and the gear 97 is oppositely beveled to properly engage with the gear 101. An arm is pivotally mounted on the right hand side bar of the main frame and is similar in construction to the arm 54 which has been previously described. The forward slotted end of this arm engages the right hand end of the shaft 100. A vertical operating lever 104 is loosely mounted at its lower end within the rear box-like part of the arm. The arm is provided with a spring similar to the spring 57 which engages the lower end of the lever 104. A catch or hook is provided on the right hand handle bar 12 and serves to hold the operating lever 104 in one position.

A sheet metal seed chute 119 is mounted on a rear cross bar of the main frame. This seed chute serves to conduct the seed to a point between the two parts of the runner or furrow opener 78.

At the rear end of the machine and connected to it by means of links 120 is a weighted seed covering device 121 which is preferably formed of sheet metal and is adapted to fill the furrow formed by the plow and the runner.

Having now described in detail the structural features of the machine to which I at present refer to embody my invention I will proceed to a description of the operation.

The fertilizer drops from the hopper 15 through the chute 76 and into the furrow, while the seeds in the hopper 81 drop through the seed hopper 119 into the furrow.

The machine is drawn preferably by means of horses hitched to the short tongue 6, and is manually guided by means of the handle bars 12—12. The ground is loosened and the furrow is partly opened by means of the forward digger or plow 73. The nose 74 following immediately behind the plow serves to push back the earth loosened by the plow and to clear the furrow for the fertilizer. It will be noted from a reference to Fig. 1 that the furrow formed by the plow and the nose has steep sides. The earth at the sides of the furrow is momentarily held in place by the walls 75—75 at the side of the nose. The fertilizer chute 76 is so located that it discharges fertilizer into the furrow immediately behind the nose 74. On account of the steepness of the sides of the furrow, the dirt falls in and partly fills the furrow as soon as the retaining walls 75 have passed. This earth, as it falls, becomes intimately mixed with the fertilizer discharged from the chute, and in fact, largely or completely covers the fertilizer.

The runner 78 moves in the partly filled furrow and serves to clear it for the planting of the seed. The block 79 is provided with a beveled surface, and this serves to slightly pack the loose earth and fertilizer in preparation for the depositing of the seed. The seed to be planted is discharged through the chute or boot 119 into the smoothed groove left by the block 79 and the runner 78. Immediately after the depositing of the seed, they are covered with a thin layer of earth by means of the following covering device 121.

It will be noted that the depth of planting may be adjusted by changing the points of connection between the plates 80—80 and the ends of the side bars 2—2.

What I claim is—

In a planter of the class described, the combination with a primary narrow opener to form a relatively deep furrow, a fertilizer distributer arranged to deliver fertilizer immediately behind said opener, vertically arranged walls diverging laterally from the furrow opener to points outside of the line of fertilizer delivery and adapted to temporarily prevent the earth from falling into the furrow until the fertilizer is deposited and to permit more or less of the earth to thereafter fall, a second furrow opener arranged to operate at lines higher than the lines of fertilizer deposit to open a furrow in the top part of the fallen earth and leave a stratum on the fertilizer, a pressing device for packing the top of said stratum, means to deposit seed immediately behind the packer, means for holding the second furrow opener adjustably in rigid position relatively to the lines of fertilizer deposit, and a furrow-filling and earth-packing device having its operative surface arranged to cover the seed and fill the furrow and pack the earth at the normal surface.

In testimony whereof I affix my signature, in presence of two witnesses.

CHARLES E. WHITE.

Witnesses:
 ROBERT M. ADAMS,
 OSCAR F. LUNDAHL.

Copies of this patent may be obtained for five cents each, by addressing the "Commissioner of Patents, Washington, D. C."